United States Patent [19]

Patterson, Jr.

[11] Patent Number: 4,917,332
[45] Date of Patent: Apr. 17, 1990

[54] WINGTIP VORTEX TURBINE

[75] Inventor: James C. Patterson, Jr., Newport News, Va.

[73] Assignee: The United States of America as represented by the Administrator of the National Aeronautics and Space Administration, Washington, D.C.

[21] Appl. No.: 264,993

[22] Filed: Oct. 28, 1988

Related U.S. Application Data

[63] Continuation-in-part of Ser. No. 4,304, Jan. 5, 1987, abandoned, which is a continuation-in-part of Ser. No. 243,685, Mar. 16, 1981, abandoned.

[51] Int. Cl.$^4$ .............................................. B64D 33/00
[52] U.S. Cl. ...................................... 244/58; 244/199; 290/44; 290/55
[58] Field of Search ......................... 244/198, 199, 58; 415/DIG. 1, 1, 2-4; 416/223; 290/43, 44, 54, 55

[56] References Cited

U.S. PATENT DOCUMENTS 2,555,807  6/1951  Morris ..................................... 244/58
4,045,144  8/1977  Loth ......................................... 415/1
4,047,832  9/1977  Sforza .................................. 244/199
4,172,574  10/1979  Spillman ............................. 244/199

FOREIGN PATENT DOCUMENTS 57646  3/1953  France ................................ 244/199

OTHER PUBLICATIONS

Portroy, "Aerodynamic Effects of Vortex Suppressors", AD/A—003750, Jul. 1974.

Primary Examiner—Galen Barefoot
Attorney, Agent, or Firm—George F. Helfrich; John R. Manning; Charles E. B. Glenn

[57]  ABSTRACT

A means for extracting rotational energy from the vortex created at aircraft wing tips which consists of a turbine with blades located in the crossflow of the vortex and attached downstream of the wingtip. The turbine 30 has blades 40, 41, 42 and 43 attached to a core 45. When the aircraft is in motion, rotation of core 45 transmits energy to a centrally attached shaft 50. The rotational energy thus generated may be put to use within the airfoil 20 or aircraft fuselage 10.

9 Claims, 3 Drawing Sheets

WINGTIP VORTEX TURBINE

ORIGIN OF THE INVENTION

The invention described herein was made by an employee of the United States Government and may be manufactured and used by or for the Government for governmental purposes without the payment of any royalties thereon or therefor.

This application is a continuation-in-part of co-pending application Ser. No. 004,304, filed Jan. 5, 1987, which is a continuation-in-part of co-pending application Ser. No. 243,685, filed Mar. 16, 1981 both now abandoned.

BACKGROUND OF THE INVENTION

This invention relates generally to aircraft aerodynamics and specifically to a method and apparatus for extracting energy from the lift-induced vortex at or near the wingtips of aircraft.

Under lifting conditions, an airfoil creates a vortex system which is shed along the span, with a concentrated vortex centered just behind each wingtip. This vortex is a pure by-product of lift. It is not necessary for the production of lift and is a major source of aircraft induced drag. The vortex system generated by large aircraft (above 250,000 lbs.) poses serious hazards for following aircraft. Smaller aircraft in established flight paths are affected seriously by such vortex systems.

Much research has concentrated on attenuation of this lift-induced vortex. Commonly known means for dissipation or attenuation of the vortex include vertical winglets attached at the wingtips, such as the plates described in U.S. Pat. No. 3,411,738 to Sargent. Various fan-like attachments designed to break up the vortical airflow at the wingtips, to reduced hazards to following aircraft, have also been tested. U.S. Pat. Nos. 3,984,070 and 3,934,844, to Patterson, Jr. and Reighart II, respectively, are representative of this type of art. The patent to Patterson, Jr. discloses a vortex-attenuating spline device attached at the wingtips. That to Reighart II describes a vortex generator which creates a vortex opposite in direction to the wingtip vortex, in effect cancelling some of its effects.

These prior art attachments yield energy in a sense, in the form of decreased drag, but no means has been shown to extract from the wingtip vortex energy directly usable in an aircraft.

More recently, some research has focused on the use of blades oriented transversely in the airstream vortex to dissipate vortical energy. Fixed, cambered vanes have been placed one chord length behind the airfoil trailing edge. These vanes provide induced drag reduction, but do not allow transfer of energy for use elsewhere in the aircraft.

A tip turbine has been tested for its "energy extraction" potential. Net power recovery in the form of decreased drag is optimum at turbine rotation=0 rpm; study discloses that a nonrotating turbine placed in the wingtip area will replace a single concentrated vortex with a series of vortices emanating from the vane tips. The "energy extraction" of the nonrotating turbine, however, is not available for utilization as mechanical energy.

In summary, prior art shows no means for extracting energy from the lift-induced vortex, for further utilization within the aircraft. It is an object of the present invention to provide an apparatus capable of extracting energy from the lift-induced vortex and converting it into a form of energy directly usable within an aircraft.

It is another object of the invention to provide such an apparatus wherein the vortex energy is attenuated.

It is another object of the invention to provide such an apparatus wherein the lift-induced vortex energy may be extracted and used as rotational energy.

It is another object of the invention, to provide such an apparatus wherein turbine blades intercept the vortex airflow behind the trailing edge of the aircraft wing.

It is still another object of the invention to provide such an apparatus wherein rotation of turbine blades powers a generator, pump, or similar apparatus within the aircraft.

It is yet another object of the invention to provide such an apparatus wherein the turbine blades are tapered and cambered for maximum efficiency.

It is a further object of the invention to provide such an apparatus wherein the decrease in induced drag reduction associated with rotation of the turbine blades is more than offset by the energy transmitted for utilization within the aircraft.

It is another object of the invention to provide such an apparatus wherein the airfoil-turbine blade angle of attack is such that energy transmitted for further utilization is high in proportion to the decrease in induced drag reduction brought about by rotation of the turbine blades.

It is another object of the invention to provide such an apparatus wherein the energy transmitted to the shaft may be utilized for airfoil boundary layer control or similar use.

SUMMARY OF THE INVENTION

These and other objects are accomplished by a wingtip vortex turbine which attenuates the rotational flow of the vortex as it extracts a portion of the vortex energy as rotational shaft energy.

A turbine is mounted at the tip of the wing and positioned to operate in the crossflow produced by the vortex. The blades produce a force in proportion to the relative angle of attack between the blade and the crossflow. The turbine is coupled to a shaft which, turning at a speed dependent on the blades, provides rotational energy. This rotational energy may activate a pump, generator or similar apparatus; in one embodiment involving a laminar flow control (LFC) wing, the wingtip vortex turbine provides energy for the operation of an electrical generator which in turn may control the wing boundary layer. Use of the wingtip turbine gives a significant weight reduction in new technology aircraft using electric control systems as opposed to the traditional hydraulic system. The wingtip vortex turbine provides an energy-efficient means for attenuating a lift-induced vortex. Rotation of the turbine blades is a tradeoff with the direct reduction in induced drag seen to some extent in the prior art; but the energy extraction, in the form of rotational energy, more than offsets this energy loss. The wingtip vortex turbine is driven solely by the wingtip vortex crossflow that is created by the lifting wing in flight. If the wing is not producing lift, and consequently there is no vortex, as in the case of a wing having a symmetrical airfoil section set at zero angle of attack in a wind tunnel, the wingtip vortex turbine will not rotate.

BRIEF DESCRIPTION OF THE DRAWINGS

The invention will be more fully described in conjunction with the accompanying drawings wherein.

DETAILED DESCRIPTION OF THE INVENTION

Figure 1:
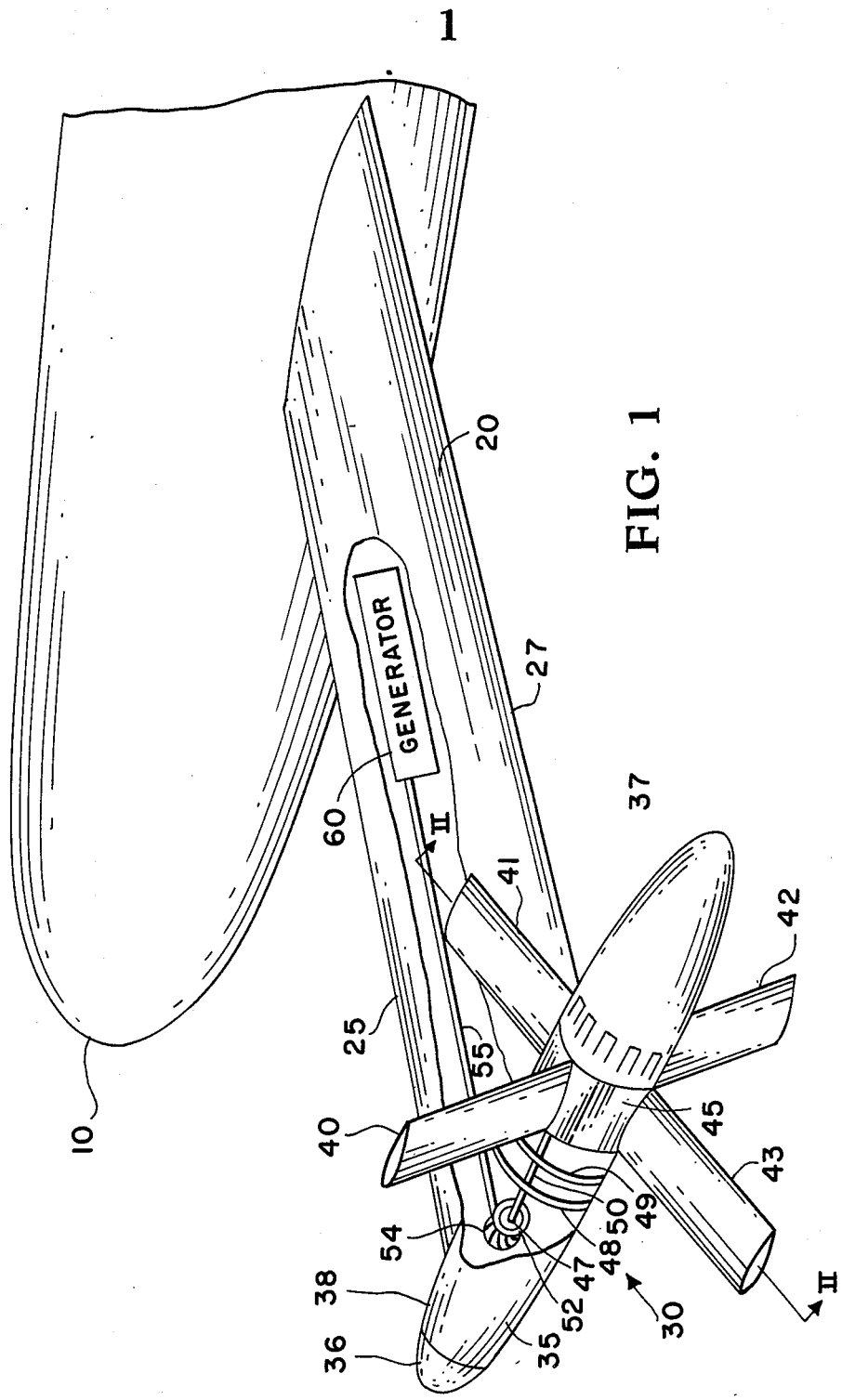
FIG. 1 is a perspective view of the invention with airfoil and aerodynamic housing cut away.

A basic understanding of the invention can best be accomplished by reference to FIG. 1 which depicts the preferred embodiment of the invention. There is shown an aircraft fuselage 10 with airfoil 20 attached. The wingtip vortex turbine, generally designated by the reference numeral 30, is affixed to the airfoil 20 at its tip area 25, and is partially sheathed in an aerodynamic housing 35. This housing 35 includes an aerodynamically faired nose 36 and an aerodynamically faired base 37, in addition to an intermediate sheath 38.

The wingtip vortex turbine 30 includes blades 40, 41, 42 and 43 attached to a rotatable core 45 at equally spaced points thereabout. The base 37 of housing 35 may be constructed to rotate with the core 45. The blades 40, 41, 42 and 43 are lifting panels, oriented behind the trailing edge 27 of the airfoil 20, at its tip 25. A shaft 50, shown in FIGS. 2 and 3, attached to the core 45 at its center 47 completes the basic structure of the preferred embodiment. Rearings 48 and 49 support the shaft 50.

FIG. 1 further shows utilization of the wingtip vortex turbine 30 in connection with a generator 60, or a pump or similar mechanism. The rotational energy of the shaft 50 may be transferred to the generator 60 in a number of well-known ways. One simple such way involves interaction of gears 52 and 54, and shaft 55. Other means for transferring the rotational energy of the shaft 50 to the generator 60 will be obvious to those skilled in the art.

Figure 2:
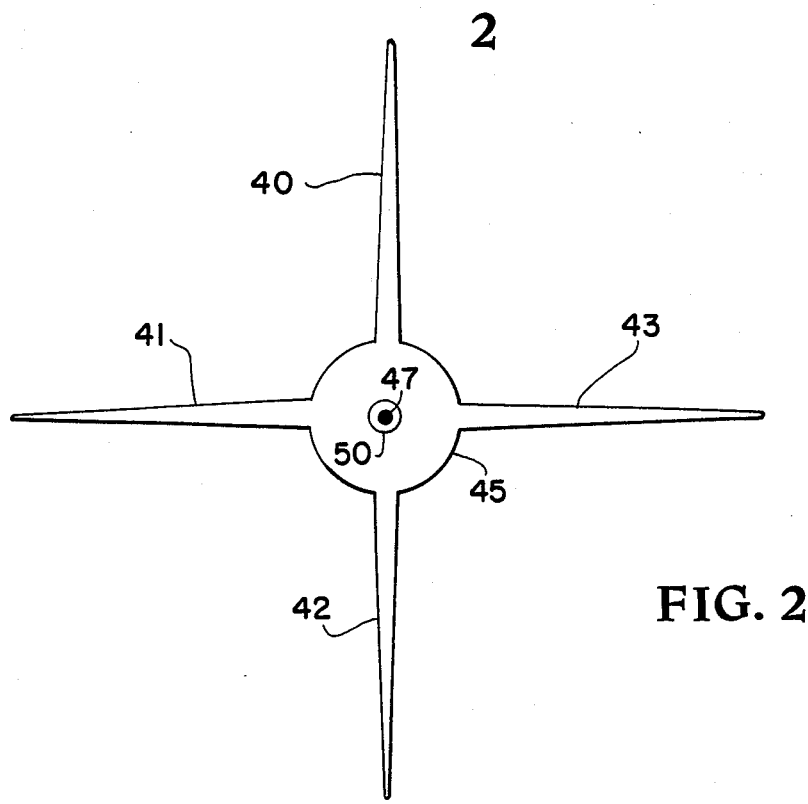
FIG. 2 is a cross-sectional view of the wingtip vortex turbine with section taken along line II-II of FIG. 1.
Figure 3:
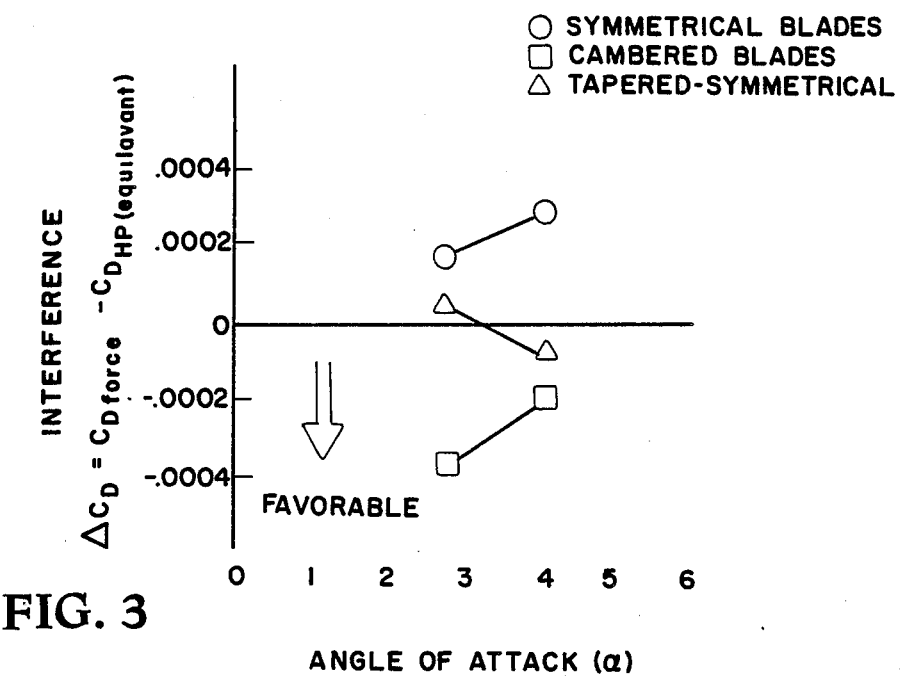
FIG. 3 graphically illustrates the relative energy extraction allowed by various embodiments of the wingtip vortex turbine.

FIG. 2 illustrates attachment of the shaft 50 to the core 45. In this view, shaft 50 has been press fitted into an aperture in the core 45. Other means of attachment will be known to those skilled in the art; for maximum rotational energy extraction, attachment is at center 47 of the core 45. Blades 40, 41, 42 and 43 are tapered.

Design of blades 40, 41, 42 and 43 is important when an efficient transfer of energy is desired. The classical vortex cross-sectional velocity distribution indicates that greatest tangential vortex velocity occurs at the edge of the vortex core and diminishes radically from that point. Each of blades 40, 41, 42, and 43 may be tapered such that the chord of the blade at the tip is smaller than at the blade root, thus exposing the largest blade area to the highest energy portion of the vortex while the blade area and associated blade drag is reduced in the low energy region of the vortex. The blade airfoil section should also be cambered to maximize the blade lift. Cambering of the airfoil 20 is also energy-efficient.

In one model of the present invention, a core of aluminum alloy, of two-inch diameter, was used. To this core, four lifting panels each four inches in length (five inches semispan), also of aluminum alloy, were attached. The model was successfully tested on an airfoil of thirteen-inch tip chord. The number of lifting panels may be varied according to desired results. Best results have been achieved when blade diameter has approximated 75% of airfoil tip chord.

Figure 4:
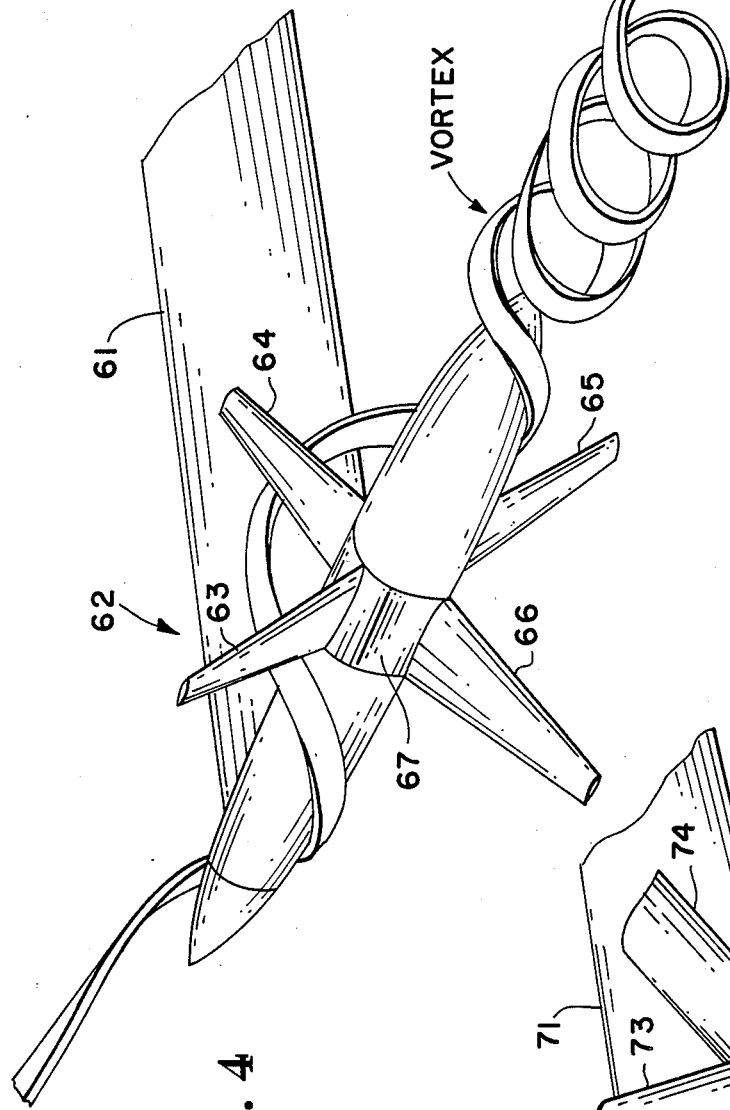
FIG. 4 is a perspective view of a tapered-blade alternate embodiment of the invention with relative vortex flow.
Figure 5:
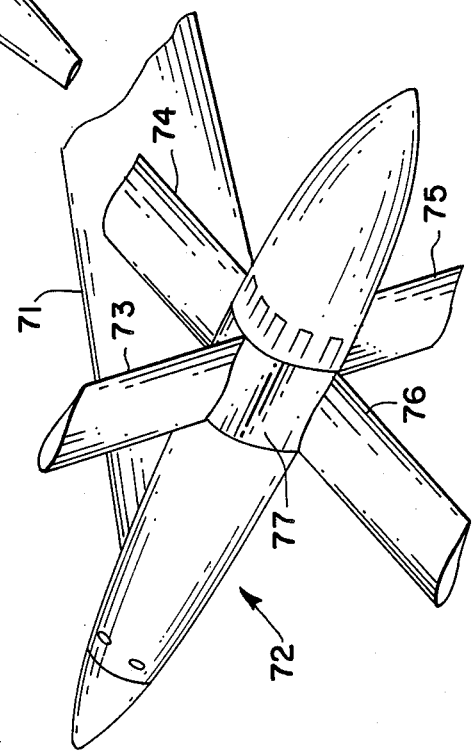
FIG. 5 is a perspective view of a cambered-blade alternate embodiment of the invention.

Alternate designs for blades 40, 41, 42 and 43 are shown in FIGS. 4 and 5. FIG. 4 shows tapered blades 63, 64, 65 and 66 attached to turbine core 67. The wingtip vortex turbine, generally designated by the reference numeral 62, is attached to airfoil 61. FIG. 5 similarly shows cambered blades 73, 74, 75 and 76, attached to turbine core 77. The wingtip vortex turbine, here generally designated by the reference numeral 72 is attached to airfoil 71. Other details remain as described above. Tests indicate that turbine blades which are both tapered and cambered are excellent blades for the wingtip vortex turbine 30. Cambering provides more efficient lifting; tapering reduces drag of the blades 40, 41, 42 and 43 and, as described more fully above, by placing the maximum blade area at the highest energy portions of the vortex.

Operation of the wingtip vortex turbine 30 is best understood by again referring to FIGS. 1 and 2. As the aircraft flies, a lift-induced vortex is created in the area of the airfoil tip 25, behind the trailing edge 27. Depending on the airstream-blade angle of attack, the blades 40, 41, 42 and 43, a core 45, rotate. This rotation activates the shaft 50, the rotational energy of which may be used to power a generator 60 or similar mechanism within the airfoil 20 or fuselage 10.

If the symmetrical blade turbine is not allowed to rotate, the maximum blade lift is produced resulting in maximum degradation of the vortex and maximum induced drag reduction, but no rotational energy is transferred to the central shaft 50. If the airfoil-blade angle of attack is such that maximum lift is produced (just below blade stall) the maximum amount of rotation energy is transferred to the central shaft 50, but the induced drag reduction for the aircraft is lessened.

In one embodiment of the present invention, where the turbine blades are cambered and at an aircraft angle of attack of four degrees an additional 65% in energy extraction in the energy conversion to rotational energy is realized over that of a similar arrangement using symmetrical blades at Mach number 0.70. Results of this test may be found in FIG. 3, which shows the relationship of angle of attack to airstream-turbine blade interference for symmetrical, tapered, and cambered blades, where interference $\Delta CD = CD_{force} - CD_{HP}$, and $CD_{force} = CD_{RPMJo}$   $CD_{RPM} = 0$ and $CD_{HP} = (HP \times 550)/qVs$ For purposes of these equations,
 CD = drag coefficient = $D/qs$
 q = dynamic pressure
 s = wing area
 V = velocity
 HP = horsepower.

It is to be understood that the preceding figures and descriptions represent isolated embodiments of the wingtip vortex turbine and are not meant as limitations on the scope of the invention. In an aircraft designed for high speed, the blade configuration may differ from those described. The lifting panels might be, for instance, swept back at an angle approximating the angle of wing sweep. This and other structural and functional modifications will become obvious from the teachings of the present invention. The turbine may be useful in water as well as in the air, and may be used whenever energy is desired to be extracted from a vortex analogous to those described herein. FIG. 1 illustrates an embodiment of the wingtip vortex turbine having symmetrical blades; the tapered and cambered blades discussed in the specification and pictured in FIGS. 4 and 5 are not intended to be the only alternatives to this basic design.

Comments within the preceding description are similarly not meant to restrict in any way the use of energy extracted by the wingtip vortex turbine. Although FIG. 1 shows a shaft transferring rotational energy to a centrally placed generator, other means of using the extracted energy will become known to those skilled in the art. Energy can be transmitted directly from the turbine to the armature of a generator or similar structure located in the turbine core and transmitted by electrical conductors or other methods known in the art to any point in the airfoil or body of an airplane.

What is claimed as new and desired to be secured by Letters Patent of the United States is:

1. An apparatus for reducing induced drag on an aircraft by attenuating a lift-induced vortex and for extracting energy from the vortex, the apparatus comprising:
    a moving vehicle;
    lift-producing surface means on said vehicle inducing a naturally-occurring wingtip vortex having a crossflow, said lift producing surface means having a leading edge, a trailing edge and a wingtip chord;
    turbine means, positioned on the lift-producing surface means so that it is driven solely by said wingtip vortex crossflow with no power being derived from freestream airflow, for reducing induced drag on the moving vehicle by attenuating the lift-induced vortex and extracting rotational energy from said vortex, said turbine means further having a position adjacent to and aft of said wingtip chord, said turbine means having turbine blades with a blade diameter greater than 60% and less than 160% of said wingtip chord, said turbine blades positioned in the crossflow of the wingtip vortex occurring outside the vortex core, providing energy for utilization within the aircraft without any thrust penalty to the vehicle propulsion system, and
    means for utilizing said rotational energy within said moving vehicle.

2. An apparatus as in claim 1 wherein said means for utilizing said rotational energy is shaft means associated with and actuated by rotational motion of said turbine means.

3. An apparatus as in claim 2 wherein said moving vehicle is an aircraft.

4. An apparatus as in claim 3 wherein said blade means are cambered blade means.

5. An apparatus as in claim 3 wherein said blade means, having tips and roots, have chords which are tapered such that the chords of said blade means are smaller at the tips than at the roots.

6. An apparatus as in claim 5 wherein said blade means are cambered blade means.

7. An apparatus as in claim 3 wherein the force produced by said blade means is coupled to said shaft, providing means for transfer of energy to said shaft.

8. An apparatus as in claim 3 wherein said blade means are oriented at an angle of attack such that airstream-turbine blade interference is minimized.

9. An apparatus as in claim 1 wherein said means for utilizing said rotational energy within said moving vehicle is a generator located at the center of said turbine and within said vortex core.

* * * * *